June 10, 1930.  G. H. ISLEY  1,762,299
CONTROL AND REVERSAL OF REGENERATIVE FURNACES
Filed Nov. 19, 1926  3 Sheets-Sheet 1

Inventor:
George H. Isley
By Geo. H. Kennedy
Attorney

June 10, 1930.  G. H. ISLEY  1,762,299
CONTROL AND REVERSAL OF REGENERATIVE FURNACES
Filed Nov. 19, 1926  3 Sheets-Sheet 2

Inventor:
George H. Isley
By Geo. H. Kennedy Jr.
Attorney

June 10, 1930.  G. H. ISLEY  1,762,299
CONTROL AND REVERSAL OF REGENERATIVE FURNACES
Filed Nov. 19, 1926  3 Sheets-Sheet 3
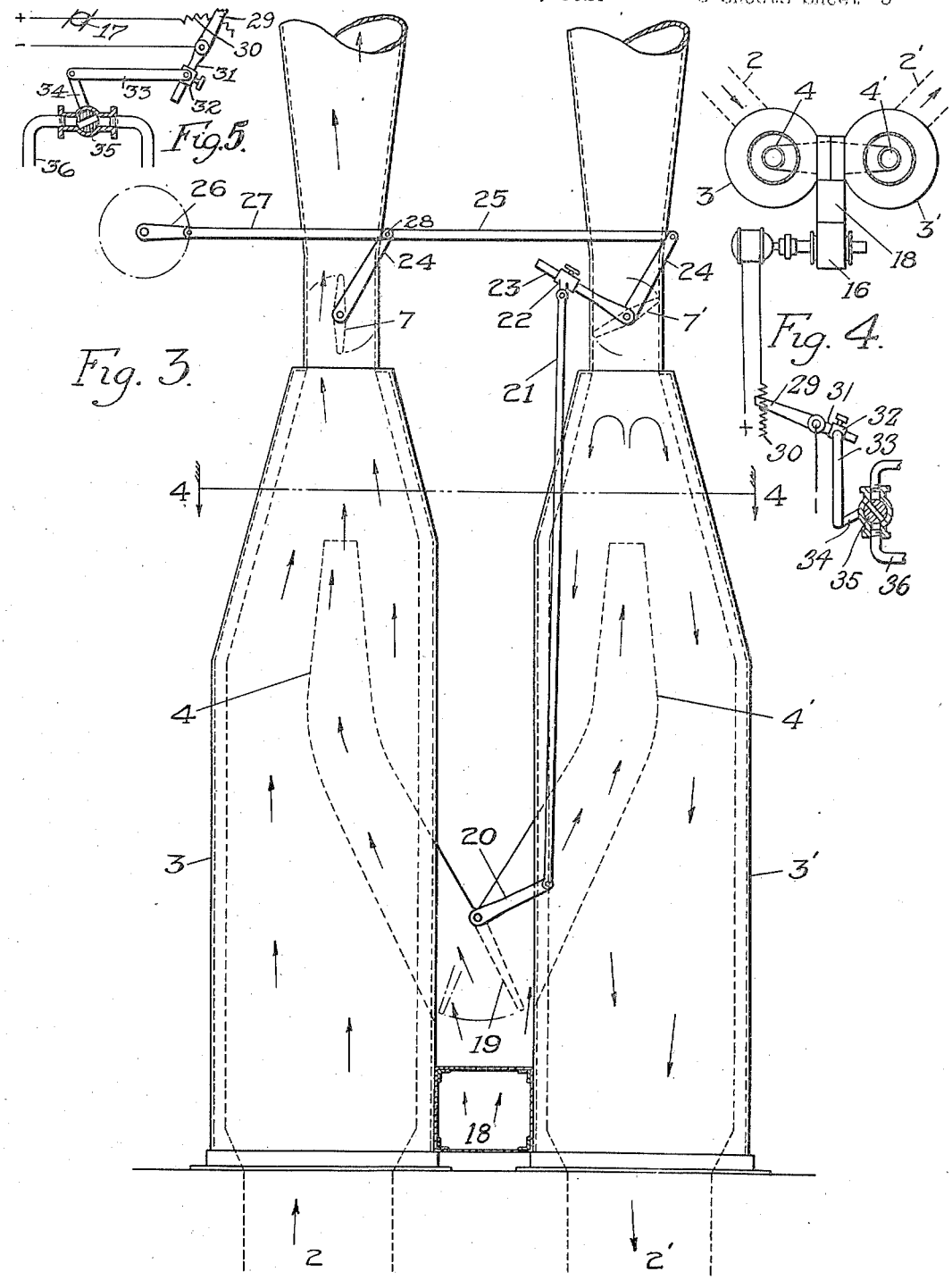

Patented June 10, 1930

1,762,299

UNITED STATES PATENT OFFICE

GEORGE H. ISLEY, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

CONTROL AND REVERSAL OF REGENERATIVE FURNACES

Application filed November 19, 1926. Serial No. 149,436.

The present invention relates to improvements in the control and reversal of regenerative furnaces, by way of greatly simplifying the means employed for supplying air to and for exhausting the waste gases from such a furnace, and by way of utilizing such means, in the absence of the usual complicated reversing apparatus, to effect the reversal of the furnace.

To this end, the invention contemplates the discharge of readily controlled quantities or jets of air into Venturi tubes which are connected with the two regenerator passages of such a furnace, the arrangement being such that through either one of said passages, selectively, air is supplied for the support of combustion within the furnace, while through the other passage, by ejector action of the air jet, is procured the egress of the combustion products from the furnace. Associated with the blowing device or devices used to produce these air jets, are a pair of valves or dampers situated in the throats of the Venturi tubes, for controlling the direction of flow therethrough, all as more fully set forth hereinafter with reference to the accompanying drawings, in which—

Figure 3 illustrates an arrangement wherein a single blowing device serves for both Venturi tubes.

Figure 4 is a small scale view, partly in horizontal section on the line 4—4 of Figure 3.

Figure 5 is a fragmentary small scale view illustrating the joint control of the motor shown in Fig. 4 and of the fuel supply to the furnace.

Like reference characters refer to like parts in the different figures.

Figure 1:
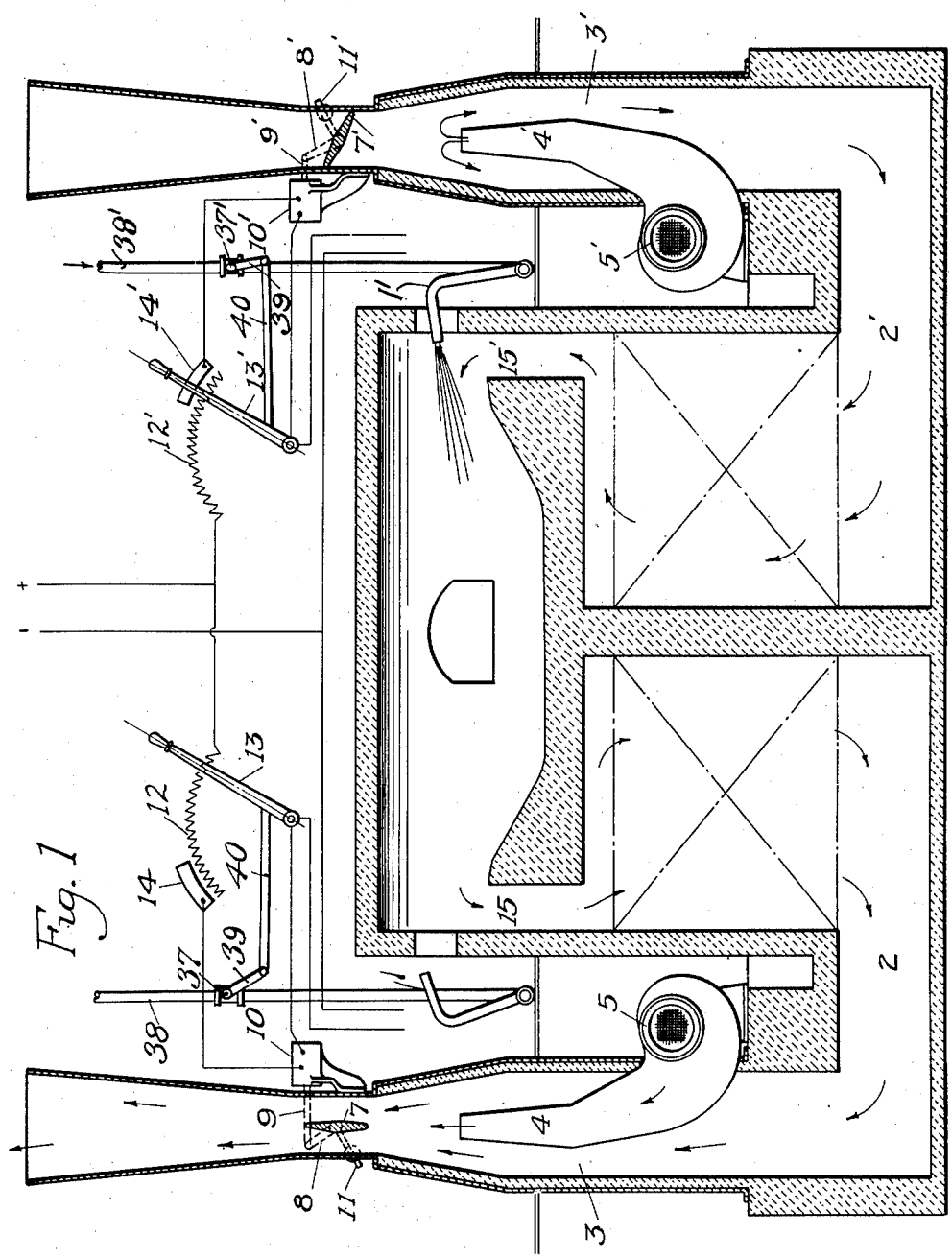
Figure 1 is a sectional developed view of a regenerative furnace of conventional type, to which the invention is shown applied.

The invention is applicable, in general, to any type of regenerative furnace, irrespective of the fuel used therein. The furnace shown in Fig. 1, for example, is adapted for the use of oil, coke oven gas, tar, powdered coal, and the like, as fuel,—involving the employment of suitable burners 1, 1' at each end of the furnace chamber. Under these conditions, the invention is applicable to the regenerative heating of the air used to support combustion of the fuel, said air being admitted to the furnace, alternately, from opposite ends, by way of regenerator passages 2 and 2'. The air regenerator passages 2 and 2' are connected, respectively, to upwardly opening ducts 3 and 3', each preferably in the form, substantially, of a Venturi tube. Within the ducts 3 and 3', in proper relation to the Venturi throats thereof, are the upwardly directed nozzles 4 and 4', respectively, these nozzles being supplied with air by exteriorly located blowing devices 5 and 5', each driven by any suitable means, such as an electric motor 6, Fig. 2.

Within the throat portion of each Venturi tube is disposed a valve or damper, one being numbered 7, and the other 7'. Each valve or damper has its spindle extended through the wall of the tube to carry an operating arm 8 or 8', and in the present instance, each such operating arm has connected thereto a plunger or movable member 9 or 9' operated by a solenoid 10 or 10'. In the absence of electric current through such solenoid, the associated valve or damper 7 or 7', assumes a full open position, as indicated on the left hand side of Fig. 1, by reason of the action of a counterweighted arm 11, or 11', attached to its spindle; when the solenoid is energized, by passage of electric current therethrough, the associated valve or damper is drawn into closed position, as indicated at the right hand side of Fig. 1, to close the Venturi throat.

Figure 2:
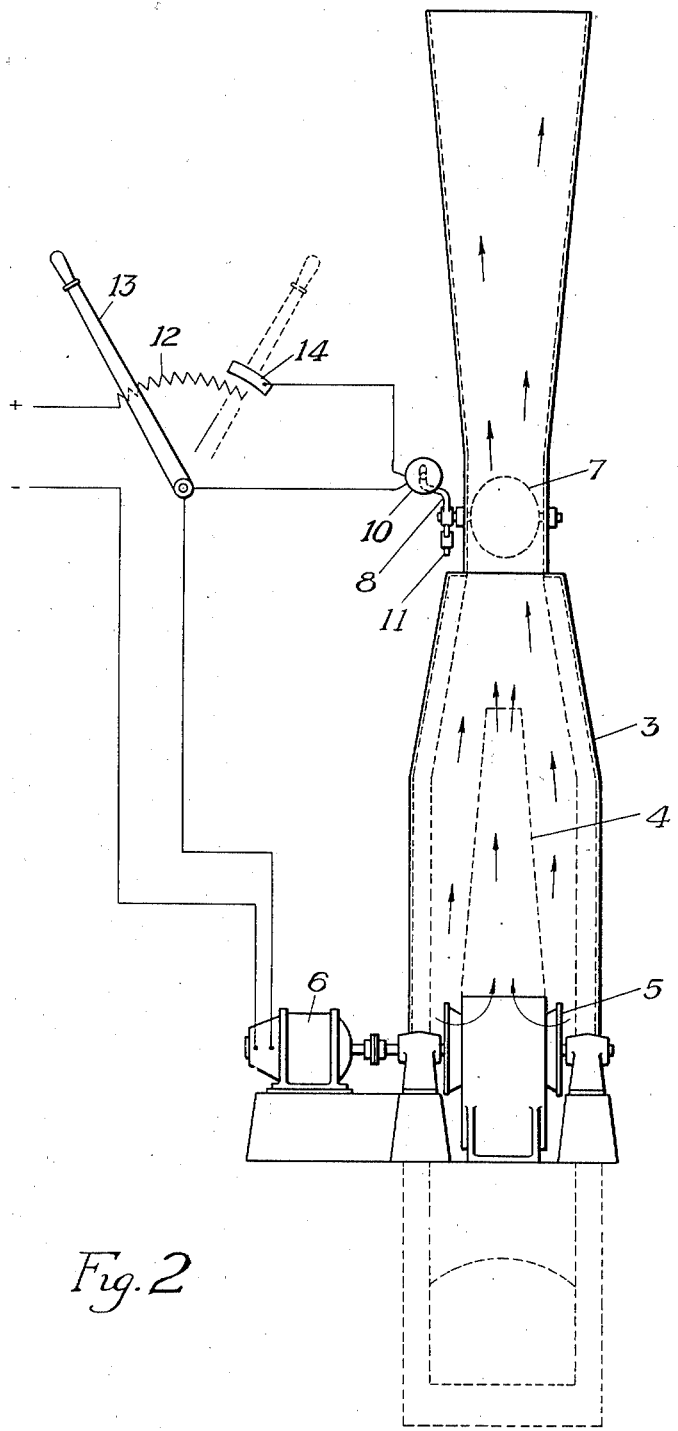
Figure 2 is a view illustrating in further detail the joint control of each blowing device and the valve or damper in the associated Venturi tube.

Joint control of the valve and of the volume of air supplied by its associated nozzle is best illustrated in Fig. 2, wherein the electrical circuit for the motor 6 of the blowing device 5 includes a resistance element 12 for controlling the motor speed. A hand lever 13, cooperating with said resistance element, is part of this circuit, and when said lever is in the full line position of Fig. 2

(which excludes the resistance element 12 from the circuit), the motor 6 will operate at maximum speed to force the maximum quantity of air through the nozzle 4. As the handle 13 is moved to the right, to introduce more and more resistance into the circuit, the speed of the motor and the quantity of air handled by the blower 5 is reduced, and when the handle 13 reaches the dotted line position of Fig. 2, corresponding to a very much reduced speed of the motor, it makes contact with a member 14, which is electrically connected to the solenoid 10, the latter also being electrically connected to the pivotal axis of the handle, so that said solenoid is thereupon brought into an electrical circuit and is operated so as to move the valve 7 into closed position.

In connection with the passage of gases through the furnace from right to left as shown in Figure 1, the left hand burner 1 is held in an inoperative position, and the right hand burner 1' is made to furnish the fuel to the furnace. The air for suppporting combustion is drawn from the atmosphere into the blower 5', which operates at a relatively low speed, due to the slow speed position of the handle 13' in contact with member 14', in which position the valve 7' stays closed. It should be noted that the member 14' is of sufficient length to permit a limited manipulation of handle 13' without breaking the circuit through solenoid 10', thereby permitting sufficient adjustment of the motor speed to vary the quantity of air supplied by nozzle 4' in accordance with the demands of the furnace. Said air is directed downwardly through the duct 3' by the closed valve 7', and it flows by way of regenerator passage 2' to the furnace port 15', adjacent the burner 1'. Here the air mixes with fuel from burner 1' and the resulting combustible mixture is burned in the furnace. It is obvious that by controlling the amount of fuel passing through burner 1' and the amount of air discharged from blower 5' (by adjustment of its motor's speed), the proper combustion may be maintained in the furnace.

The products of combustion leave the furnace by way of port 15 and regenerator passage 2, entering the bottom of duct 3, where they are drawn upwardly and discharged from the top of said duct by the entraining action of the air discharged from nozzle 4,— which air has free exit through the duct 3, due to the fact that the valve 7 in said duct automatically assumes an open position, its solenoid 10 remaining unenergized because the hand lever 13 is kept in a high speed position remote from the contact 14. Under these conditions, said hand lever 13 is operable to vary the speed of motor 6 over a wide range, in the absence of closure of the valve 7, so that the exhaust of combustion products through duct 3, by the entraining action of the air from nozzle 4, can be made as fast or as slow as desired.

The reversal of the furnace is effected by simply throwing both hand levers 13 and 13' to the left, Fig. 1, and by causing the burner 1 to become operative and the burner 1' inoperative. This movement of the hand levers closes the valve 7 and opens the valve 7', reduces the speed of blower 5, and increases the speed of blower 5' and hence procures the inlet of air in suitably limited quantity to the furnace through regenerator passage 2 and furnace port 15, and the exhaust of combustion products through furnace port 15', regenerator passage 2' and duct 3',—the latter by the entraining action of the air discharged at relatively high pressure by nozzle 4'. It is obvious that by suitably varying the high pressure air discharged by nozzle 4 or 4', as the case may be, on the outgoing side, a suitable draft may be maintained; and by suitably varying the low pressure air discharge from nozzle 4 or 4', as the case may be, on the ingoing side, the proper amount of ingoing air will be supplied to the furnace; and that the furnace may be properly controlled at all times regardless of atmospheric conditions.

Figs. 3 and 4 show the two ducts 3 and 3' arranged in juxtaposition, with their respective nozzles 4 and 4' supplied with air from a common blower 16, driven by a single motor 17. The air supplied by blower 16 is conveyed by a tubular member 18, which branches at its outer end into the two nozzles 4 and 4', and at this point is disposed a valve or damper 19, adapted to effect a suitable distribution of the air supply between the two nozzles. To this end, the stem of valve or damper 19 has secured thereto an arm 20, from which extends upwardly a link 21, the latter having an adjustable connection, indicated at 22, with an arm 23, projecting from the spindle of one of the valves or dampers 7 or 7', in this case the valve 7'. The spindles of said valves 7 and 7', according to this arrangement, are equipped with parallel arms 24, 24, which are connected at their free ends by a link 25, the latter being actuated in any suitable manner for the joint movement of said valves, as by a crank 26, having a connecting rod 27 pivotally attached at 28 to the link 25.

Fig. 3 illustrates the parts in the positions which they occupy for the passage of gases through the furnace from right to left. With the crank 26 in the position shown, the valve or damper 7' closes the tube 3', and the valve 19 is rocked to the right, so that only a relatively small amount of the air passes through nozzle 4',—the great bulk of the air entering the nozzle 4 and passing upwardly through the tube 3, whose valve or damper 7 is wide open. The air supplied to the tube 3' by nozzle 4' is led by regenerator passage 2' to the furnace for the support of combustion therein, and the large amount of air discharged at high pressure into the tube 3 by nozzle 4 has the desired ejector action in said tube to withdraw the products of combustion from said furnace by way of regenerator passage 2.

Reversal of the furnace is effected by simply revolving the crank 26 through 180°, which action moves the valve 7 into closed position, and the valve 7' into open position, at the same time shifting the valve 19 to the left, so that it restricts the flow of air to the nozzle 4, but opens up a practically unrestricted flow of air to the nozzle 4'. Under these conditions, the flow of combustion products through the furnace will be from left to right, the air for supporting combustion entering by way of tube 3 and regenerator passage 2, and the combustion products being drawn out through regenerator passage 2' into tube 3' by the entraining action of the air from nozzle 4', which has free exit through the top of tube 3'. The adjustable connection 22 between rod 21 and arm 23 permits of variations in the setting of valve 19, so as to obtain any desired distribution of the air from blower 16 between the nozzles 4 and and 4'.

As shown diagrammatically in Fig. 5, the motor 17, employed to drive the single blower 16 of Fig. 4, may have its speed controlled by movement of a hand lever 29, operatively associated with a suitable resistance 30 in the electrical circuit containing said motor. An extension 31 of said lever has adjustably connected to it, at 32, a link 33 which in turn is connected to an arm 34 of a valve 35, the latter adapted to throttle the supply of oil, or other fuel, supplied to the burner 1 or 1' of the furnace through pipe 36. In this way, the amount of air handled by blower 16, as determined by the speed of motor 17, can be kept proportionate to the amount of fuel supplied through pipe 36, and inasmuch as the air handled by said blower not only furnishes the air required for combustion, but also takes care of the draft for the exhaustion of the combustion products from the furnace, it follows that these last two factors, air supply and draft, will be automatically varied in proportion to variations in the fuel supply, thus insuring the most efficient operation of the furnace at all times. This same joint control of the fuel and air supply devices is obtained with the arrangement of apparatus shown in Fig. 1 by the provision of valves 37 and 37' in the fuel supply pipes 38 and 38', respectively, that are connected to the burners 1 and 1'. Each valve 37, 37' has an arm 39 connected by a suitable link 40 to the associated hand lever 13 or 13', the arrangement being such that with the levers 13 and 13' in their right hand positions, as shown in Fig. 1, the valve 37' is open for the passage of fuel to the burner 1', while the valve 37 is closed; when the two levers 13 and 13' are thrown to the left from the position illustrated in Fig. 1, for the reversal of the furnace, the valve 37 is opened, for the supply of fuel to the burner 1, while the valve 37' is closed.

From the foregoing, it will be clear that apparatus of the simplest character, when arranged as above described, is utilized for the successive reversals of the furnace, and that said apparatus can be readily manipulated and adjusted to give complete control over a wide range of all the conditions, such as air supply, draft, and temperature, that affect the operation of the furnace. After said furnace has become sufficiently hot, the control and reversal thereof can be effected even without the manipulation of the dampers 7 and 7', because on the ingoing side (here shown as the right hand side of Figs. 1 and 3), the relatively small quantity of air delivered by the nozzle 4' under low pressure, is caused, by the shape of duct 3', to lose so much of its initial velocity that, under the influence of the draft produced by the hot furnace, it will flow into said furnace, instead of passing out of the open end of duct 3'.

I claim:

1. In a regenerative furnace, a plurality of air regenerator passages, an open-ended Venturi duct leading from each of said passages, means for supplying air in an outwardly-directed jet to each of said ducts, and a damper in each duct, adapted in closed position to direct said air to the furnace, for the support of combustion therein, and adapted in open position, to allow entrainment by said air of the waste gases from the furnace, and the discharge of said gases through the open end of the duct.

2. The combination with a regenerative furnace, of outwardly-opening ducts leading from each end of said furnace, means for supplying air in outwardly-directed jets to each of said ducts, and a damper in each duct, adapted in closed position to direct said air to the furnace, for the support of combustion therein, and adapted in open position, to allow entrainment by said air of the waste gases from the furnace, and the discharge of said gases through the open end of the duct.

3. In a regenerative furnace, an outwardly-opening duct leading from one end of said furnace, means for supplying air in an outwardly-directed jet to said duct, a damper in said duct, regulating means operable to increase or diminish the volume of air supplied to said duct, and means for closing said damper in response to movement of said regulating means to a predetermined position.

4. In a regenerative furnace, an outwardly-opening duct leading from one end of said furnace, a damper in said duct, means for supplying air in variable amounts to said duct, for the entrainment and discharge therefrom of waste gases when said damper is in its open position, and means operative to close said damper when the amount of air supplied to said duct is decreased to a predetermined point.

5. In a regenerative furnace, an outwardly-opening duct leading from one end of said furnace, a damper in said duct, means for supplying air in variable quantity to said duct for inflow to the furnace, to support combustion therein, when said damper is in closed position, and means operative to move said damper into open position when the air supply to said duct is increased to a predetermined point.

6. In a regenerative furnace, an outwardly-opening duct leading from each end of said furnace, an air supply means having branches opening into both of said ducts, a valve controlling the distribution of air between said branches, a damper in each duct, connections between said dampers to dispose one in open position when the other is closed, and other connections between said dampers and said valve, to position the latter so that the larger volume of air will be supplied to the duct with the open damper.

7. In a regenerative furnace, an outwardly-opening duct leading from each end of said furnace, an air supply means having branches opening into both of said ducts, means for varying the amount of air supplied by said supply means, means for supplying fuel to the furnace in proportion to the amount of air handled by said supply means, a valve controlling the distribution of air between said branches, a damper in each duct, connections between said dampers, to dispose one in open position when the other is closed, and other connections between said dampers and said valve, to position the latter so that the larger volume of air will be supplied to the duct with the open damper.

8. In a regenerative furnace, a pair of outwardly-opening ducts each leading from one end of said furnace, means for supplying air to each duct in an outwardly directed jet, to entrain in either of said ducts the waste furnace gases, for the discharge of the same to the atmosphere, and means in each duct beyond the point of air supply to close said duct and thereby direct said air back to the furnace for the support of combustion therein.

9. The combination with a regenerative furnace, of outwardly-opening ducts leading from each end of said furnace, means for supplying air in outwardly-directed jets to each of said ducts, a damper in each duct, and means operable on each damper to open or to close the same as the air supplied to its associated duct is respectively increased or decreased, whereby with a small supply of air to either duct the damper thereof is closed, to direct said air to the furnace for the support of combustion therein, and with a large supply of air to either duct the damper thereof is opened, to permit the entrainment by said air of the waste furnace gases and the discharge of said gases through the duct.

10. In a regenerative furnace, a pair of outwardly opening ducts, each of which leads from one end of said furnace, a damper in each of said ducts, means for supplying air in variable quantity to each of said ducts, to obtain in one duct when its damper is opened the entrainment and discharge therefrom of waste gases from the furnace, and to obtain in the other duct when its damper is closed the inflow of air to the furnace for the support of combustion therein, and means operable on each damper to open or to close the same in response respectively, to an increase or a decrease in the volume of air supplied to its associated duct.

11. The combination with a regenerative furnace, of drafting and reversing apparatus therefor, comprising an outwardly opening duct leading from a regenerator passage of said furnace, a blowing device for supplying air to said duct, a damper in said duct, and means for jointly controlling the position of said damper and the quantity of air supplied to said duct by said blowing device.

12. The combination with a regenerative furnace, of drafting and reversing apparatus therefor, comprising an outwardly opening duct leading from a regenerator passage of said furnace, a blowing device for supplying air to said duct, throttling means associated with said blowing device, a damper in said duct, and means for jointly controlling said damper and said air throttling means.

13. The combination with a regenerative furnace, of drafting and reversing apparatus therefor, comprising an outwardly opening duct leading from a regenerator passage of said furnace, a blowing device for supplying air to said duct, an air throttling means associated with said blowing device, a damper in said duct, an adjustable connection between said damper and said air throttling means, and a single operating device for said damper and said air throttling means.

14. The combination with a regenerative furnace, of an outwardly opening duct leading from a regenerator passage of said furnace, means for discharging an air jet in said duct, an adjustable damper in said duct beyond the point of air jet discharge, and means responsive to the opening and closing movements of said damper for varying the volume of air supplied to said jet.

15. In a regenerative furnace, a pair of outwardly-opening ducts each of which leads from one end of said furnace, a damper in each of said ducts, means for supplying air to each of said ducts, to obtain in one duct when its damper is open the entrainment and discharge therefrom of waste gases from the furnace, and to obtain in the other duct when its damper is closed the inflow of air to the furnace for the support of combustion therein, means for varying the amounts of air supplied to said ducts by said supply means, and means for supplying fuel to said furnace in proportion to the amount of air delivered to the furnace through the duct whose damper is closed.

Dated this fifteenth day of November, 1926.

GEORGE H. ISLEY.